United States Patent
Amacker et al.

(10) Patent No.: US 8,966,446 B1
(45) Date of Patent: Feb. 24, 2015

(54) SYSTEMS AND METHODS OF LIVE EXPERIMENTATION ON CONTENT PROVIDED BY A WEB SITE

(75) Inventors: Matthew Amacker, Santa Clara, CA (US); Thomas G. Brinck, Palo Alto, CA (US)

(73) Assignee: A9.com, Inc., Palo Alto, CA (US)

( * ) Notice: Subject to any disclaimer, the term of this patent is extended or adjusted under 35 U.S.C. 154(b) by 878 days.

(21) Appl. No.: 12/893,876

(22) Filed: Sep. 29, 2010

(51) Int. Cl.
*G06F 9/44* (2006.01)

(52) U.S. Cl.
USPC ............. 717/124; 709/225; 714/38; 717/115; 717/130

(58) Field of Classification Search
None
See application file for complete search history.

(56) References Cited

U.S. PATENT DOCUMENTS

| | | | | |
|---|---|---|---|---|
| 7,127,641 B1* | 10/2006 | Anderson | ..................... | 714/38.1 |
| 7,757,175 B2* | 7/2010 | Miller | ........................... | 715/738 |
| 8,224,823 B1* | 7/2012 | Amacker | ..................... | 707/736 |
| 8,327,271 B2* | 12/2012 | Miller | ........................... | 715/738 |
| 8,505,106 B1* | 8/2013 | Bhosle et al. | .................... | 726/28 |
| 8,515,931 B1* | 8/2013 | Amacker | ..................... | 707/705 |
| 8,667,467 B2* | 3/2014 | Dubey et al. | .................. | 717/125 |
| 8,677,141 B2* | 3/2014 | Erlingsson et al. | ........... | 713/187 |
| 8,745,600 B2* | 6/2014 | Lanzkron et al. | ............ | 717/135 |
| 2001/0011365 A1* | 8/2001 | Helfman | ........................... | 717/1 |
| 2003/0023641 A1* | 1/2003 | Gorman et al. | ............... | 707/530 |
| 2003/0088716 A1* | 5/2003 | Sanders | ........................ | 709/330 |
| 2003/0182424 A1* | 9/2003 | Odendahl | ..................... | 709/225 |
| 2004/0199818 A1* | 10/2004 | Boilen et al. | ..................... | 714/25 |
| 2005/0273832 A1* | 12/2005 | Zigmond et al. | .............. | 725/112 |
| 2006/0155780 A1* | 7/2006 | Sakairi et al. | .................. | 707/201 |
| 2007/0180429 A1* | 8/2007 | Gogh et al. | ..................... | 717/126 |
| 2008/0195978 A1* | 8/2008 | Wissenbach et al. | ......... | 715/854 |
| 2008/0289029 A1* | 11/2008 | Kim et al. | ........................ | 726/12 |
| 2009/0064330 A1* | 3/2009 | Shraim et al. | .................... | 726/22 |
| 2009/0210863 A1* | 8/2009 | Vasilik | ........................... | 717/130 |
| 2009/0287658 A1* | 11/2009 | Bennett | ............................ | 707/3 |
| 2010/0005410 A1* | 1/2010 | Pang | ............................. | 715/765 |
| 2010/0235737 A1* | 9/2010 | Koh | ............................. | 715/704 |
| 2010/0251217 A1* | 9/2010 | Miller | ........................... | 717/126 |
| 2010/0325615 A1* | 12/2010 | Ramot | ........................ | 717/124 |
| 2012/0011149 A1* | 1/2012 | Zurek | ........................... | 707/770 |
| 2013/0024845 A1* | 1/2013 | Lanzkron et al. | ............. | 717/130 |

OTHER PUBLICATIONS

Dave Raggert, Arnaud Le Hors and Ian Jacobs, "HTML 4.01 Specification", Dec. 24, 1999, W3C (p. 251-259).*

* cited by examiner

*Primary Examiner* — Don Wong
*Assistant Examiner* — Roberto E Luna
(74) *Attorney, Agent, or Firm* — Novak Druce Connolly Bove + Quigg LLP (57) ABSTRACT

Techniques for experimentation on live content in a production environment are disclosed. In one embodiment, a method for live experimentation comprises receiving a first request from a client computing device for an instance of content, sending a second request for an instance of content to a content provider, receiving the instance of content from the content provider in response to the second request, associating a test script with the received instance of content, and sending the instance of content with the associated test script to the client computing device. The client computing device is configured to execute the test script on the instance of content without modifying content executed by the content provider.

25 Claims, 7 Drawing Sheets

SYSTEMS AND METHODS OF LIVE EXPERIMENTATION ON CONTENT PROVIDED BY A WEB SITE

BACKGROUND

Electronic entities having a presence in an electronic environment, such as may be provided via a Web site or other such source of content, typically need to have an ability to test or conduct experiments on the content (e.g., Web site) that do not interfere with the user experience. For example, a Web site may require maintenance, repair, or modification that would involve testing of new software applications associated with the site, repairing existing software, and the like. There are several conventional methods of conducting experiments related to a Web site's maintenance or modification. One method would be to modify the site itself, which can adversely affect the user experience. Another method would be to ask the user to install a script or application on the user's browser that would modify the site. For example, a user may be asked to install a Greasemonkey® script on his browser which causes the changes made to the Web page to be executed every time the page is opened, thus making the changes effectively permanent for the user running the script, which can be fairly intrusive for the user and for an electronic entity operating the site.

A third method would be to simply rebuild the Web site in a test environment, effectively duplicating the original Web site. This method may prove costly and only marginally effective considering that an alternate site, however scrupulously duplicated, still may not reflect all events happening on a "live" site due, for example, to "real-time" user traffic, thus making software testing much less accurate. Furthermore, the electronic entity operating the Web site may not receive a customer feedback relating to a proposed site modification or upgrade prior to making a serious investment in time and resources for providing the proposed modification.

DETAILED DESCRIPTION OF THE INVENTION

Systems and methods for live testing or experimentation on content provided by an electronic entity, such as a Web site in a production environment, are presented. The presented techniques provide for experimentation on, or other testing of, at least a portion of a live Web site that does not involve a modification of an original Web site or the creation of a costly testing environment (e.g., duplicating the Web site) for experimentation purposes, nor do the presented techniques cause any additional security concerns for the Web site. In one embodiment, an electronic entity operates a Web server that serves the Web site content provided by the electronic entity to a user's computing device. The electronic entity may operate a proxy electronic device (hereinafter "proxy server") configured to receive and modify requests for experimentation as described below. Alternatively, a proxy server may be operated by a third party that may control (e.g., allow, disallow, or limit) the experimentation on the Web site. The electronic entity or the third party may provide test (experiment) scenarios that are to be tested during experimentation.

A user or a plurality (community) of users may participate in live experimentation or testing of electronic content, e.g., a Web site. For the purposes of simplicity, the words "experiment" and "test" will be used interchangeably in the following description. The user or users may be provided with a pointer (e.g., hyperlink or "link") pointing to the content instance (e.g., a Web site that is to be experimented on) that may be accessed via a proxy server as specified by the pointer. A pointer, or link, can be a reference to a resource (e.g., a document or file) that a user can directly follow, or that is followed automatically, across a network such as the Internet. A link can point to an entire document or file, or to a specific element, location, or portion within a document or file. An example of a Web document is a Web site that is suitable for the World Wide Web and can be accessed through a Web browser and displayed on a monitor of a computing device. A link or pointer to a Web resource will normally have a dynamically modified address data string, or resource identifier (e.g., URL) associated with the pointer and containing, among other elements, an address of the Web resource to which the pointer points.

When a user accesses the provided pointer in at least some embodiments, the user's request for the Web site is received at a proxy server designated by the pointer. The proxy server modifies the request, or generates a new request, by adding pertinent data and forwarding or sending the request to the appropriate Web server or other such address. The pertinent data may include, but is not limited to, an origination address of the request indicating that the request originated at the proxy server. The data may further include an experiment identifier, a user identifier, and/or a session identifier. The Web server responds to the request by serving the Web site to the proxy server, as the request from the proxy server appears to the Web server as a standard request from a client device. At the proxy server, the Web server's response to the request is received and/or intercepted, and modified according to the experiment identifier or another such criterion. In at least some embodiments, a trusted test script (e.g., JavaScript) may be injected into the Web server's response to the request, which normally is a Web site code. Other modifications to the Web site code may also be made, as described below, such as to inject a tag or other identifier into the Web site code that can be used to access a testing library or other source of content.

The trusted script may contain instructions for an experiment or a pointer to the instructions for an experiment. The modified response is forwarded to a browser operating on the user's client computing device. The user then may conduct an experiment utilizing the injected trusted script as described below in greater detail. During the experiment, any additional request initiated by a user can reference a "proxy" Web site, i.e., the Web site modified by the proxy server. In other words, at least certain user requests will be directed to a proxy server, instead of to a primary content server for the Web site, and thus remain in the virtual testing environment. Because the proxy server and the client computing devices operated by users are placed outside of a security protection mechanism (e.g., a "firewall") that protects the Web server, the proposed techniques introduce no additional security threats to the Web site or content provider.

In one embodiment, an electronic entity or a third party conducting the experimentation may develop a plurality of software applications, such as software libraries containing instructions for various experiments that may be injected or otherwise embedded in a tested Web site by a proxy server. In one embodiment, this could be accomplished in a JavaScript implementation. Alternatively, a user's browser which displays the tested Web site may store one or more test script identifiers. In this case, a trusted script injected into the tested Web site at the proxy server may identify a test script identifier stored in the browser and cause a corresponding test script stored elsewhere, e.g., in a local or remote data store, to be loaded on the client computing device for experimentation. In summary, a proxy device serves as an "intermediary" between a client computing device configured to conduct experimentation on content provided by a Web server. In response for content received from the client computing device, the proxy server modifies the request and passes the request on to the server. The proxy server injects a test script into the content returned by the Web server and passes the modified content on to the client computing device for experimentation. Thus, the content executed by the Web server is not affected by testing, while a user is afforded an opportunity to experiment on a "live" content without interfering with the content executed by the Web server.

Figure 1:
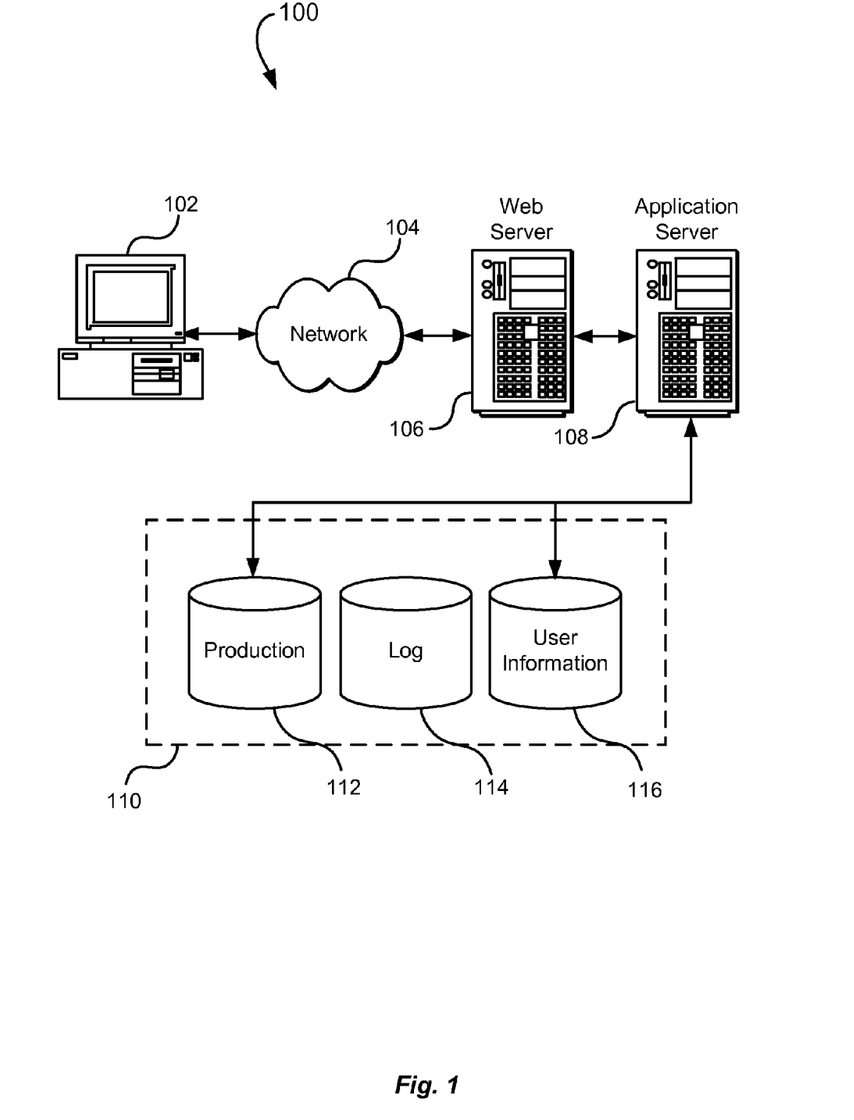
FIG. 1 illustrates an environment in which various embodiments can be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, and the environment includes a Web server 106 for receiving requests and serving content in response thereto, although for other networks, an alternative device serving a similar purpose could be used, as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein, the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to a viewer, which may be served to the viewer by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing log data 114, which can be used for reporting, generating statistics, and other such purposes. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 and obtain, update, or otherwise process data in response thereto. In one example, a viewer might submit a search request for a certain type of item. In this case, the data store might access the user information to verify the identity of the viewer, and can access the catalog detail information to obtain information about items of that type. The information then can be returned to the viewer, such as in a results listing on a Web page that the viewer is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
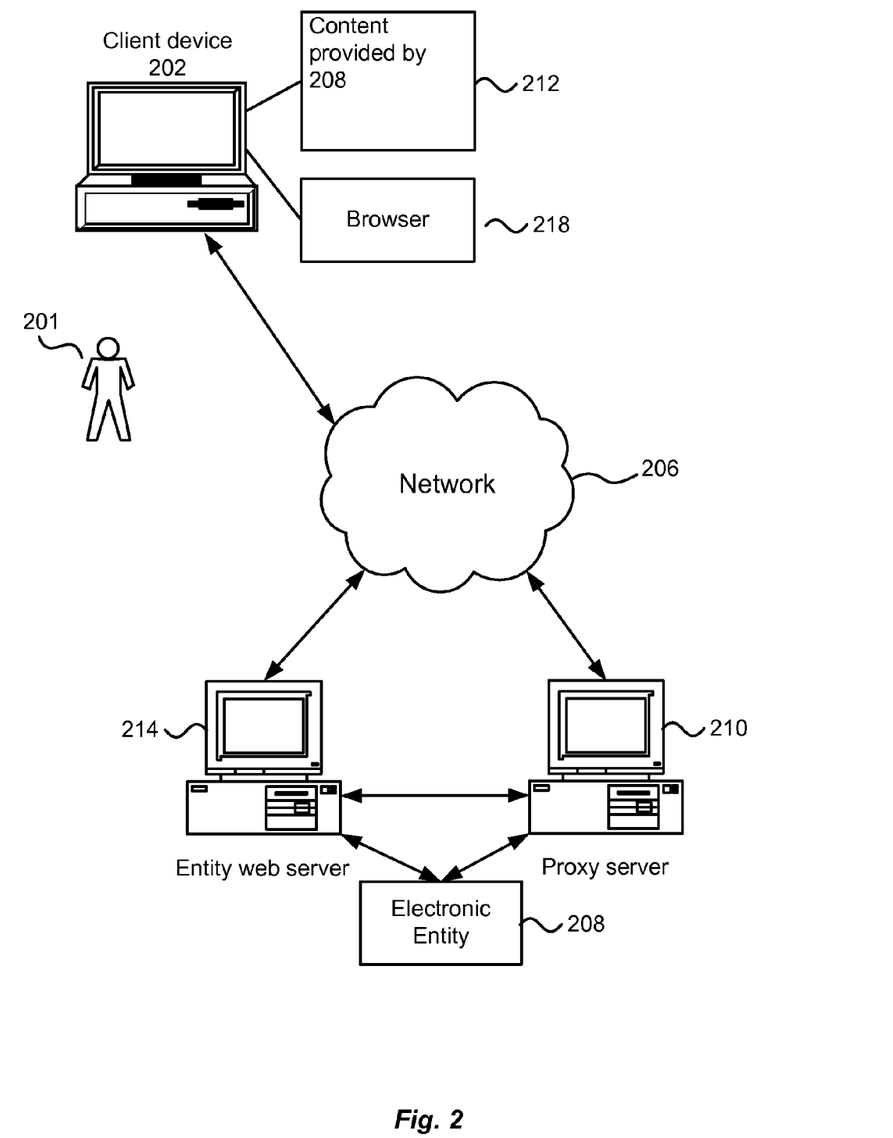
FIG. 2 illustrates a diagrammatic representation of an environment which may incorporate one or more components that are described above in connection with FIG. 1 and that may be used in accordance with various embodiments.

FIG. 2 shows an example environment 200 in which various embodiments may be practiced. The environment 200 may be realized utilizing one or more of the components of the environment described above in connection with FIG. 1. The environment 200, in an embodiment, includes a plurality of users 201 that utilize a network, such as the Internet 206, to browse content of various content providers using client computing devices 202. The environment 200 may utilize the Internet as a network; however, it should be understood that other networks may be used as an alternative to or in addition to the Internet. Examples of other networks include mobile networks, intranets, and generally any suitable communications network.

In an embodiment, users 201 may access content provided by content providers in order to consume content, search for information, purchase items offered for consumption or sale, engage in social networking and the like. As shown in FIG. 2, the environment 200 includes an electronic entity 208. The electronic entity 208, for example, may operate a proxy server 210 and a Web server 214. A content instance 212, such as a Web site that is served by the Web server 214, may be rendered to the client device 202 via a browser 218. The electronic entity 208 may also operate systems, such as those described above in connection with FIG. 1, that enable users to access Web content.

The electronic entity 208 may also operate, affiliate with, or associate with one or more content providers. In an embodiment, the content providers (not shown) may offer content for a Web site 212 operated by the electronic entity 208. The electronic entity may affiliate with content providers and Web sites 212 in a number of different ways. For example, the electronic entity may own content providers and Web sites 212. In an embodiment, the environment 200 may also include one or more affiliate or third party content providers (not shown). A third party provider may be, for example, an entity that offers content that the electronic entity 208 may allow for placement on a Web site 212 along with the content provided by the electronic entity 208.

In an embodiment, the environment 200 includes components and instructions for generating one or more Web sites 212. One or more of the Web sites 212 may be operated by the electronic entity 208, although they need not be. The Web sites 212 may offer various types of content, such as news, video, shopping or other services, search engine services, audio, social networking services, and the like. While the example environment 200 shows Web sites for the purpose of illustration, it should be understood that any type of content may be included in the environment 200 or variations thereof. For example, content may be provided in various ways, such as through an application interface or through other mechanisms that may not be properly classified as Web sites.

In an embodiment, the users 201 may interact with content in order to test parts of electronic environment 200 in order to help the electronic entity 208 update, modify, optimize, or otherwise change one or more features, layouts, or generally any content displayed in the Web sites 212 associated with the electronic entity, as discussed more fully below.

In one embodiment, the electronic entity 208 may wish to change, update, upgrade, or otherwise modify content it provides, such as the Web site 212, so as to provide additional services to a user. For example, the entity 208 may want to add a new feature to the Web site 212, such as, for example, a "button," a side bar, an overlay, or any other feature that, when accessed by a user on the client device 202, may enable one or more features pertaining to the content rendered by the Web site, for example, by rendering additional information related to a viewed item, related items offered for purchase, and the like. In order to accomplish this, the entity 208 that provides the Web site 212 may want to test the feature to be added with a subset of users prior to making the content generally available to all users. Alternatively, experimentation may be controlled and/or carried out by a third party operating the proxy server 210. As those skilled in the art will appreciate, experimentation (testing) related to any type of a Web site improvement, enhancement, update, modification, or the like may be conducted. A plurality of users may be selected to conduct experimentation in a live environment using a proxy Web site provided by the proxy server 210 as will be described below in greater detail in reference to FIGS. 3-7.

Figure 3:
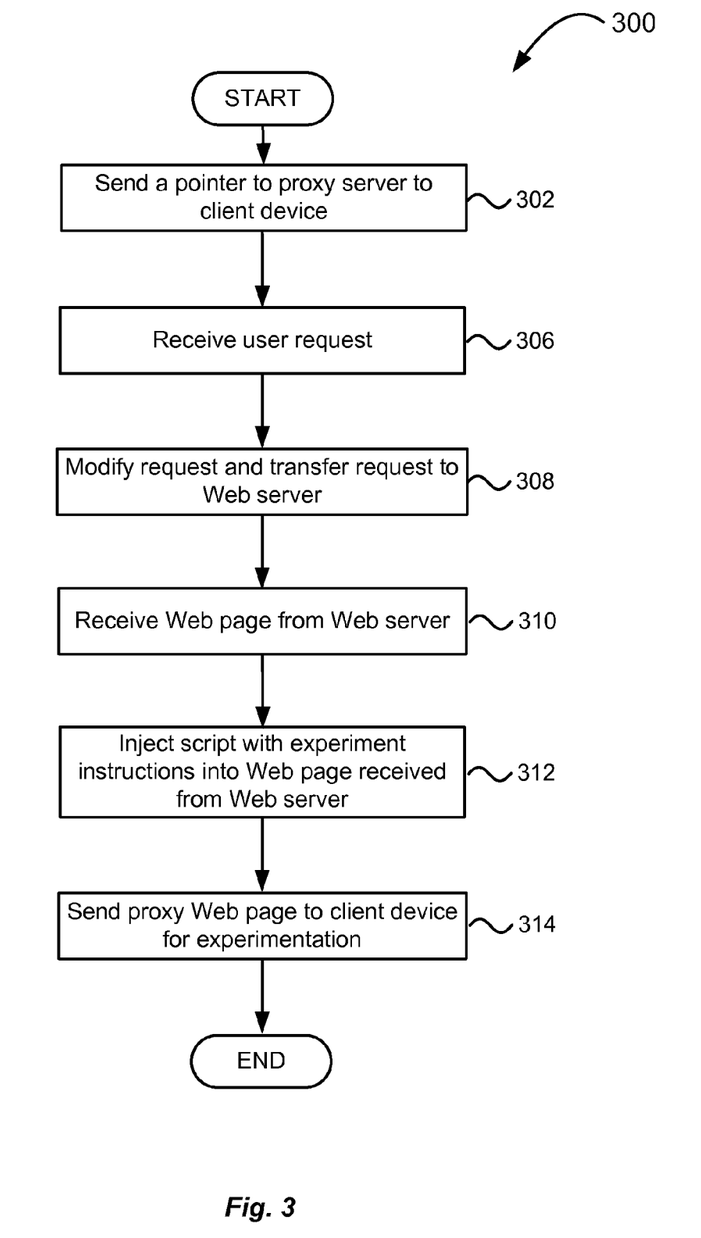
FIG. 3 illustrates a process flow diagram for live experimentation on a Web site in accordance with an embodiment.

FIG. 3 illustrates a process flow diagram for live experimentation on the Web site according to an embodiment. The process 300 starts at block 302 where a pointer to the proxy server is sent to the client computing device 202 as shown in FIG. 2. At block 306, the request from a user to conduct an experiment is received. At block 308, the request may be modified as necessary. For example, data elements (e.g., "cookies") received with the request may be modified to include a domain name of the Web site 212. The request may be further modified to provide an indication to the Web server that the request was originated at the proxy server. Other changes to the data elements may also be made as needed in order for the data elements to be recognized by the Web server. For example, a session identifier may be added to the request. The request is then forwarded to the Web server serving the Web site 212, as illustrated on FIG. 2. At block 310, a response from the Web server is received. The Web server response may typically contain a Web page code served by the Web server. The response may also contain new or updated data elements modified at the Web server. The proxy server may have access to one or more trusted test scripts, e.g., JavaScript instructions necessary for testing the Web page. At block 312, a trusted test script containing experiment instructions is injected into the response, e.g., the Web site code received from the Web server. The response may be modified further before being passed on to the client computing device as will be described below in reference to FIG. 4. At block 314, the Web site code modified at block 312 is sent to the client computing device for experimentation. The process 300 then ends.

Figure 4:
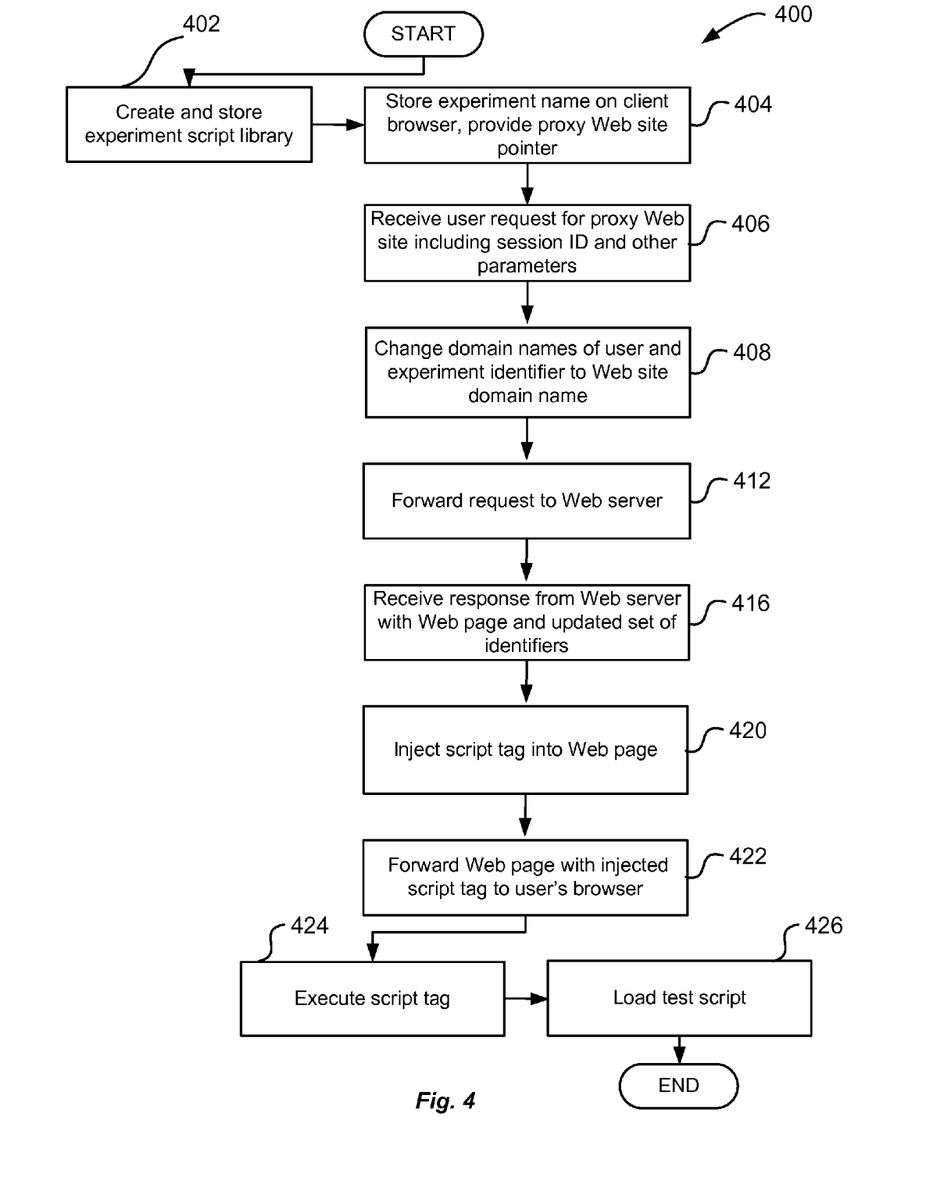
FIG. 4 illustrates a detailed process flow diagram for live experimentation on a Web site in accordance with an embodiment.

FIG. 4 illustrates a process flow diagram for live experimentation on the Web site in greater implementation detail. The process 400 starts at block 402 where an experiment library is created and stored in a data store that may be accessible by a proxy server. The library may contain a plurality of trusted scripts, e.g., JavaScript instructions necessary for testing the Web site. At block 404, a data element containing an experiment name may be stored on the client browser and a proxy Web site pointer is provided to the client computing device on which the experiment is to be conducted. At block 406, the user request for the proxy Web site is received. The user request may include a user identifier and other necessary parameters. For example, the request may typically contain a number of parameters, such as, for example, a URL included in the pointer, as well as various data elements ("cookies"). The cookies may include, but are not limited to, information including a session identifier, experiment (test) identifier, and the like. At block 408, the proxy server may modify the received request. Specifically, as described above in reference to FIG. 3, the cookies' domain names may be changed to the Web site domain name. The cookies may also be stored in a temporary data store in order to be used in a user session. The request origination address may be changed to the proxy server address. Furthermore, the cookies that are not readable by, incompatible with, or otherwise harmful to, the Web server, may be removed.

At block 412, the proxy server forwards the user's request to the Web server. At block 416, a response from the Web server is received. In some embodiments, the response contains a Web site and updated cookies associated with the user request as described above in reference to FIG. 3. At block 420, the Web page returned by the Web server may be modified. Specifically, the cookies contained in the original request and temporarily stored on the server may be modified with the data received from the Web server. Furthermore, a trusted script tag may be injected into the returned Web page code. In one embodiment, the trusted script may include a JavaScript shim file configured to execute on a client browser. At block 422, the Web page with injected script tag is forwarded to the client browser. At block 424, the script tag is executed on the client browser. The script tag, when executed, identifies the experiment identifier stored on the client browser. Finally, at block 426, a corresponding test script is retrieved from the data store in which the experiment library is stored and loaded into the client browser. The process 400 then ends.

In the described embodiment, the script tag identifies the experiment when executed on the browser and the corresponding trusted script is retrieved from the data store and injected into the client browser. It should be noted that a test script with experiment instructions may also be directly injected into the Web site code at the proxy server level, as described above in reference to FIG. 3.

Figure 5:
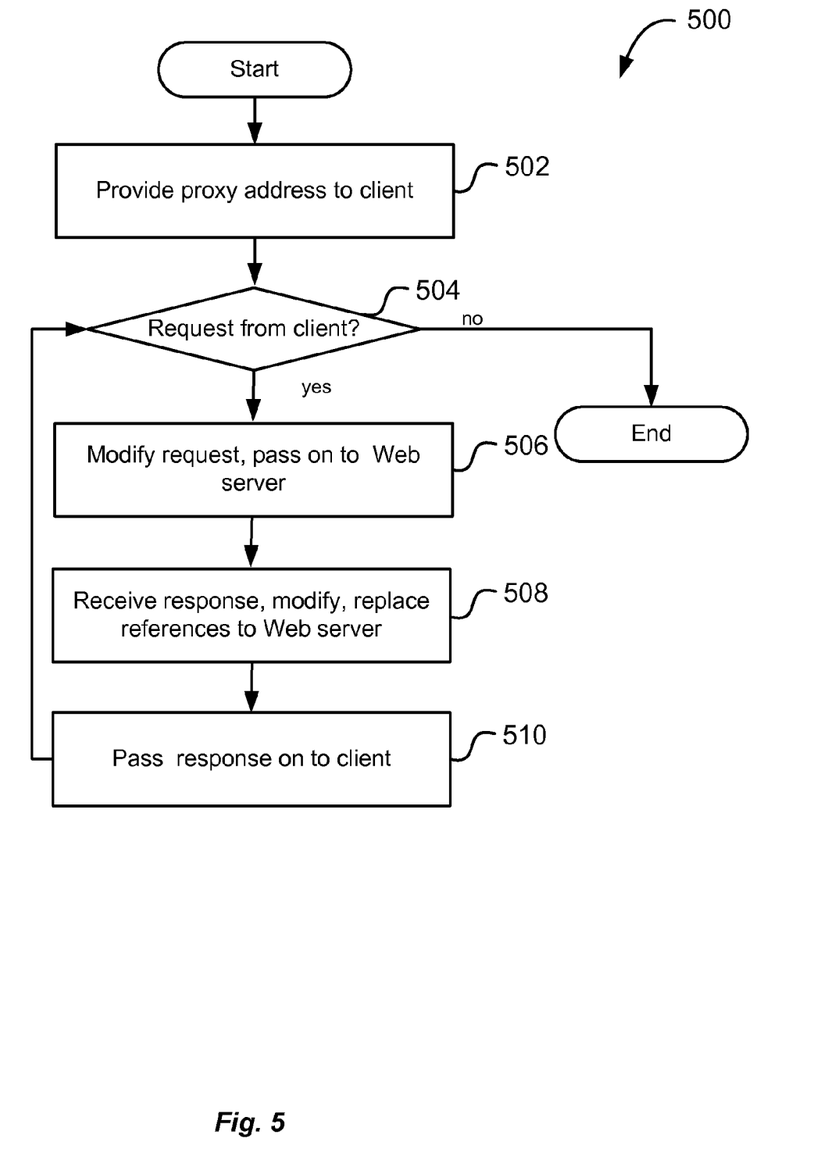
FIG. 5 illustrates another process flow diagram for live experimentation on a Web site in accordance with an embodiment.

FIG. 5 illustrates a process flow diagram for a live experimentation session on the Web site in accordance with an embodiment. The process 500 starts at block 502 where a proxy server pointer is provided to a client computing device as described above in reference to FIGS. 3 and 4. At decision block 504, it is determined whether a request for content from the client computing device is received. If no request is received, the process ends. If the request is received, at block 506, the request is modified as described above in reference to FIG. 4 and passed on to the Web site server. At block 508, the response from the Web server containing content is received and modified as described above in reference to FIGS. 3 and 4.

The content returned by the Web server may be further modified to exclude all references back to the Web server, which may be replaced by the references to the proxy server. This modification ensures that the user interaction with the Web site in a current session will stay within the testing environment. In other words, as a result of the modification, all future user requests will be sent to the proxy server which will then forward the requests to the Web server. At block 510, the response is passed on to the client computing device configured to conduct the live experimentation. The process then returns to the decision block 504 where it is determined whether the next request from the client computing device is received.

Figure 6:
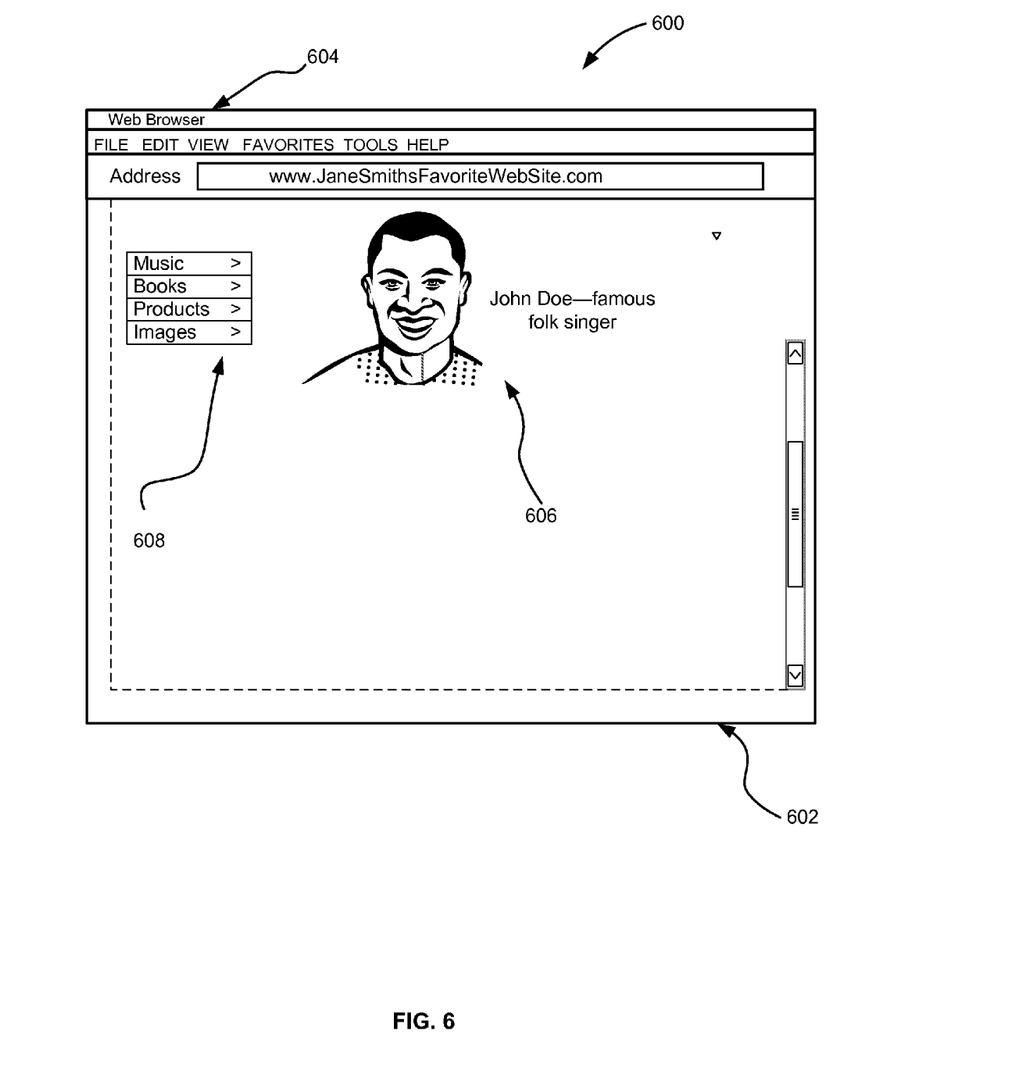
FIG. 6 illustrates an exemplary Web page rendered to a user in accordance with an embodiment.

FIG. 6 illustrates an example screenshot 600 of a Web page 602 which may be served by the Web server 214 directly to the client computing device 202 as shown in FIG. 2. In the example 600, the Web page 602 www.JaneSmithsFavoriteWebSite.com is rendered on a client computing device 202 via a Web browser 604. The Web page 602 may contain various types of content 606, such as, for example, images (in this example, "John Doe-famous folk singer"), descriptions of books, music, advertisements, products, links to other sites, and other types of content known in the art. The Web page 602 may contain item or product categories 608 as shown on the left side of the page 602, such as "music," "books," "products," and "images." It will be appreciated that any number of item categories of any kind may be included in the Web page. Further, one skilled in the art will appreciate that any type or size, configuration, layout, or shape of the Web page may be presented to a user on the client computing device 202.

Figure 7:
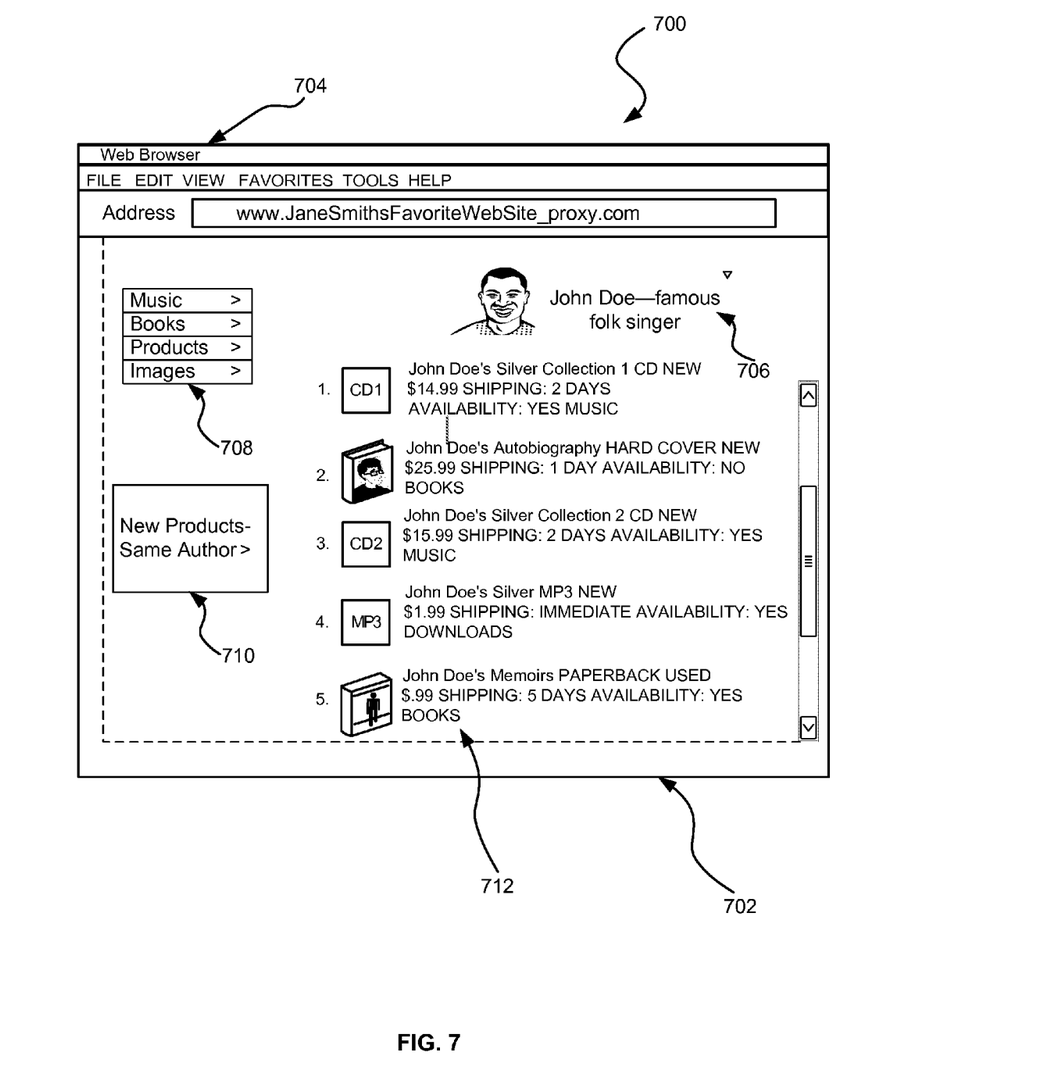
FIG. 7 illustrates an exemplary Web page modified at a proxy server and rendered to a user for experimentation in accordance with an embodiment.

FIG. 7 illustrates an example screenshot 700 of a Web page 702 returned by the Web server 214 via the proxy server 210 to the user's client computing device 202 in response to a user request in accordance with an embodiment. In the example 700, the Web page 702 www.JaneSmithsFavoriteWebSiteproxy.com is rendered on a client computing device 202 via a Web browser 704. The Web page 702, just as the Web page illustrated in FIG. 6, includes content 706 ("John Doe-famous folk singer") and a number of item categories 708 as shown on the left side of the page 702, such as "music," "books," "products," and "images."

In addition, the page 702 includes a new functionality to be tested. The code executing the new functionality may be added to the page as described above in reference to FIGS. 3-5. Specifically, as shown in FIG. 7, the page 702 includes a button 710 "New Products-Same Author" which is to be tested. In the illustrative experiment, when a user clicks the button 710, a plurality of items (products) 712 associated with John Doe will appear on the page as shown in the middle of the page 702. The products, as shown in FIG. 7, include CDs of John Doe, John Doe's biography, John Doe's MP3 available for download, John Doe's memoirs, and autobiography. Additional information associated with each item may be presented, such as an indication of whether the item is new or used, price, shipping information, availability information and the category to which the item belongs.

While the described techniques provide a way for testing a Web content "live" without interfering with the content, there may be other techniques aimed at accomplishing the same goal. For example, a content testing technique may be implemented that involves edge computing. As one skilled in the art will appreciate, edge computing is a technique which redistributes applications, data and computing power and services away from centralized points to the periphery of a network, thus bringing content as physically close to a client as possible. To ensure acceptable performance of widely-dispersed distributed services, large organizations typically implement Edge computing by deploying Web server farms with clustering, also known as edge cache servers. An edge cache server may be configured to provide a testing service as follows. The edge cache server may provide an experiment identifier to a number of users without changing a code on the server. When the edge cache server receives a request from a user that contains the experiment identifier, the server recognizes the experiment identifier and provides a test script in response to the request.

Another possible testing technique utilizing edge computing may involve an edge cache server having its own domain and distributing data elements with the server's domain identifier to users. In this case, content served by the edge cache server would actually change every time it is served instead of being modified by a proxy server as described above. A test user group in this case will necessarily comprise the entire body of users instead of a selected test user group of a desired size which the above described techniques provide.

Yet another possible testing technique may involve creating a trusted window (e.g., an iFrame) within a tested page and then modifying the created trusted window by injecting a test script into the window. This technique may require creating a special agreement between a tested site provider and a test script provider that would allow for a domain modification of a test site.

As discussed above, the various embodiments can be implemented in a wide variety of operating environments, which in some cases can include one or more client computers, computing devices, or processing devices which can be used to operate any of a number of applications. Client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response to requests from client devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation, those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, and the like.

Such devices also can include a computer-readable storage media reader, a communications device (e.g., a modem, a network card (wireless or wired), an infrared communication device), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the present disclosure as set forth in the claims.

What is claimed is:

1. A computer-implemented method for experimentation on a Web site, comprising:
   under the control of one or more computer systems configured with executable instructions,
      sending to a client computing device information including a proxy resource identifier, associated with a proxy server, and a test identifier, associated with a test script, to be used to test at least a portion of the Web site;
      in response to a client request from the client computing device for Web site information being received to the proxy server, the client request corresponding to the test identifier, sending a proxy request to a Web server associated with the Web site; and
      in response to receiving the Web site information returned by the Web server to the proxy server, modifying, by the proxy server, the received Web site information with a trusted script corresponding to the test identifier stored on the client computing device;

forwarding the modified Web site information, from the proxy server, to the client computing device; and causing the client device to execute the trusted script, identify the test identifier that is associated with the test script, retrieve the test script corresponding to the test identifier and execute the test script to render the modified Web site information on the client computing device.

2. The computer-implemented method of claim 1, wherein modifying the request further comprises including a session identifier in the request, the session identifier being associated with the client computing device.

3. The computer-implemented method of claim 1, wherein the test script is selected from a plurality of test scripts stored in a data store accessible by the client computing device or by the proxy server.

4. A computer-implemented method for testing script in a production environment, comprising:

under the control of one or more computer systems configured with executable instructions, receiving a first request from a client computing device for an instance of content;

sending a second request for an instance of content to a content provider;

receiving the instance of content from the content provider in response to the second request;

associating a test script tag with the received instance of content; and sending the instance of content with the test script tag to the client computing device, wherein the client computing device is configured to execute the test script tag, identify a test identifier that is stored on a browser of the client computing device and associated with a test script having one or more experiment instructions, retrieve the test script corresponding to the test identifier, and execute the test script on the instance of content without modifying content being served by the content provider.

5. The computer-implemented method of claim 4, wherein the test script corresponds to the test identifier included in the first request.

6. The computer-implemented method of claim 4, wherein the second request includes an indication that the second request was originated by a proxy device.

7. The computer-implemented method of claim 4, further comprising excluding a reference to the content server from the instance of content.

8. The computer-implemented method of claim 4, wherein the first request includes a session identifier that is added to the second request.

9. The computer-implemented method of claim 4, wherein the test script is selected from a plurality of test scripts stored in one of a local or remote data store.

10. The computer-implemented method of claim 4, wherein the test script comprises a JavaScript.

11. A computer-implemented method for managing third party content, comprising:

under the control of one or more computer systems configured with executable instructions, receiving, by a proxy server, a first request for Web site information from a client computing device, the request including at least one test identifier and a session identifier;

sending, from the proxy server, a second request for the Web site information to a Web server, the second request including the session identifier;

receiving, by the proxy server, the Web site information returned by the Web server;

identifying, by the proxy server, a test script tag corresponding to the at least one test identifier;

injecting, by the proxy server, the test script tag into the Web site information corresponding to the at least one test identifier; and causing the client computing device to execute the test script tag, identify the at least one test identifier that is stored on a browser of the client computing device and associated with a test script, retrieve the test script corresponding to the test identifier and execute the test script to render the modified Web site information on the client computing device.

12. The computer-implemented method of claim 11, wherein the test script is injected into the Web site information at the client computing device.

13. The computer-implemented method of claim 11, wherein identifying the test script corresponding to the at least one test identifier further comprises retrieving the test script from a data store comprising one of a local or remote data store.

14. The computer-implemented method of claim 11, wherein the session identifier is included in subsequently received requests corresponding to the at least one test identifier and corresponding requests sent to the Web server.

15. A computer system for managing third party content, comprising a processor and a memory having executable instructions that, when executed on the processor, cause the processor to:

receive a first request from a client computing device for an instance of content;

send a second request for the instance of content to a content provider;

receive the instance of content from the content provider in response to the second request;

associate a test script tag with the received instance of content;

send the instance of content with the associated test script tag to the client computing device; and cause the client computing device to execute the test script tag, identify a test identifier that is stored on a browser of the client computing device and associated with a test script having one or more experiment instructions, retrieve the test script corresponding to the test identifier, and execute the test script on the instance of content without modifying content being executed by the content provider.

16. The computer system of claim 15, wherein the test script corresponds to the test identifier included in the first request.

17. The computer system of claim 15, wherein the executable instructions that cause the processor to create the testing version of the instance of content by associating the test script with the received instance of content further cause the processor to exclude a reference to the content provider from the instance of content.

18. The computer system of claim 15, wherein the executable instructions further cause the processor to include a session identifier received with the first request to the second request.

19. The computer system of claim 15, wherein the executable instructions further cause the processor to select the test script from a plurality of test scripts stored in one of a local or remote data store.

20. A non-transitory computer-readable storage medium having computer-executable instructions stored thereon that, when executed by a computer, cause the computer to:
 receive a first request from a client computing device for an instance of content;
 send a second request for the instance of content to a content provider;
 receive the instance of content from the content provider in response to the second request;
 associate a test script tag with the received instance of content;
 send the instance of content with the test script tag to the client computing device; and
 cause the client computing device to execute the test script tag, identify a test identifier that is stored on a browser of the client computing device and associated with a test script having one or more experiment instructions, retrieve the test script corresponding to the test identifier, and execute the test script on the instance of content without modifying content being executed by the content provider.

21. The non-transitory computer-readable storage medium of claim 20, wherein the computer-executable instructions further cause the computer to add a session identifier received with the first request to the second request.

22. The non-transitory computer-readable storage medium of claim 20, wherein the computer-executable instructions further cause the computer to select the test script from a plurality of test scripts stored in one of a local or remote data store.

23. The non-transitory computer-readable storage medium of claim 20, wherein the computer-executable instructions further cause the computer to exclude a reference to the content provider from the instance of content.

24. The non-transitory computer-readable storage medium of claim 20, wherein the computer-executable instructions further cause the computer to include in the second request a request origination source that is different from the content provider.

25. The non-transitory computer-readable storage medium of claim 24, wherein the computer-executable instructions further cause the computer to cause the instance of content sent by the content provider in response to the second request to be received at the request origination source.

\* \* \* \* \*